April 8, 1969 H. E. BEEKMAN 3,437,947

SIGNAL AMPLIFIER HAVING GROUNDED-BASE STAGE FOR A CABLE TERMINATING IMPEDANCE

Filed Nov. 2, 1967

INVENTOR.
HENRICUS E. BEEKMAN

BY

Frank R. Jifari

AGENT 3,437,947
SIGNAL AMPLIFIER HAVING GROUNDED-BASE STAGE FOR A CABLE TERMINATING IMPEDANCE

Henricus Ernest Beekman, Emmasingel, Eindhoven, Netherlands, assignor to North American Philips Co., Inc., New York, N.Y., a corporation of Delaware Filed Nov. 2, 1967, Ser. No. 680,247
Claims priority, application Netherlands, Nov. 8, 1966, 6615721
Int. Cl. H03f 3/16
U.S. Cl. 330—20 2 Claims

ABSTRACT OF THE DISCLOSURE

A wide band signal amplifier composed of an emitter-follower having its output electrode connected to a coaxial cable. The other end of the cable is connected to a load via an amplifier connected in common base configuration. The high frequency response of the amplifier is improved by connecting a capacitor in parallel with the emitter-follower and a given resistor in series with the input electrode of the emitter-follower.

Figure 1:
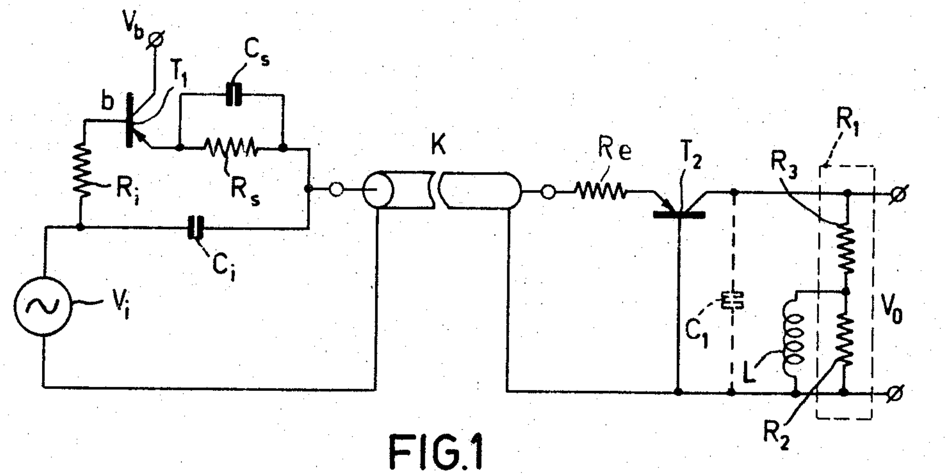

The invention relates to a signal amplifier for a source of signals to be amplified, said signal source being connected through a voltage follower amplifier via a cable to a matched cable-terminating impedance.

Such a signal amplifier is known, in which the voltage follower amplifier may be a cathode, an emitter or a source electrode follower. Such signal amplifiers are used to transmit signals from a signal source to a measuring device or another electric device. In such a signal amplifier, it is important that the cable, which is terminated by an impedance approximately equal to the characteristic cable impedance, mainly constitutes the cathode, the emitter or the source electrode impedance of the voltage follower amplifier. For in this manner, difficulties with respect to the impedance adaptation between the voltage follower amplifier, preferably having a maximum input impedance in order to minimize the load on the signal source, and the low-resistance cable, are overcome. The terminating impedance of the cable thus constitutes the output of the circuit arrangement. However, since this terminating impedance, like the cable impedance, is low-ohmic, a given current passed through the cable will produce only a low voltage across this terminating impedance. Signal amplifiers are known per se, by means of which the adaptation between a low impedance desired at an input and a high impedance desired at an output is obtained. For this purpose, use is made of an amplifier in grounded base connection, the input impedance between the emitter and the base being equal to the output impedance of a preceding network, for example, a voltage follower amplifier of the kind set forth. The output of this grounded base connection may be connected without any objection to a high impedance so that a current produced by the preceding element supplies through the grounded base connection a comparatively high voltage across the high impedance. However, without further steps being taken, the use of such an amplifier element in grounded base connection for a signal amplifier which is the subject matter of this application is not sufficient to obtain a satisfactory signal transmission from the signal source through the cable to the output.

For in the case of transmission of high and very high frequencies (for example >100 mc./s.), owing to parasitic capacitances constituted by the parasitic capacitances of the amplifier element (for example, the base-collector capacitance of the transistor and the like) and the cable capacitance, part of the high-frequency energy does not arrive at the output of the circuit arrangement.

The invention has for an object to obviate this disadvantage and to provide a signal amplifier with a cable and an output circuit by means of which in a wide frequency range a satisfactory adaptation between the various parts is obtained, so that altogether a satisfactory signal transmission can be ensured.

The invention consists in that the cable-terminating impedance is constituted by the emitter-base circuit of an amplifier in grounded base connection, while provision is made of a capacitor connected in parallel with the said voltage follower amplifier and of a resistor connected in series with the input electrode of the voltage follower amplifier and having a value sufficient to compensate for the loss of amplification for high-frequency signals in the amplifier in grounded base connection.

The invention thus comprises a combination of steps by which the intended purpose is attained. The invention will now be described more fully with reference to the figure shown in the drawing.

Figure 1A:
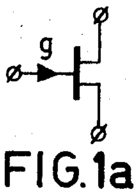

In the drawing, FIGURE 1 shows an embodiment of a signal amplifier according to the invention, and FIG. 1*a* shows a preferably used field effect transistor "FET."

In FIGURE 1, $V_i$ denotes the signal source. A terminal of the signal source $V_i$ is connected to a point of fixed potential, such as the outer conductor of a coaxial cable K. Another terminal of the signal source $V_i$ is connected through a series resistor $R_i$ to the base of a transistor $T_1$ and to a terminal of a capacitor $C_i$. The other terminal of the capacitor $C_i$ is connected to the inner conductor of the cable K. The collector of the transistor $T_1$ is connected to a terminal of a supply voltage source $V_b$. The emitter also is connected, through the parallel-combination of a capacitor $C_s$ and a resistor $R_s$, to the inner conductor of the cable K. At the other end of the cable K, the inner conductor is connected through a resistor $R_e$ to the emitter of a transistor $T_2$ connected in grounded base configuration. The collector of this transistor is connected to a resistor $R_1$. The resistor $R_1$ constitutes the output $V_o$ of the signal amplifier and comprises a part $R_3$ and a part $R_2$ across which is connected a coil L. A capacitor $C_1$ represents the overall parasitic capacitance of the output circuit.

Thus, the circuit arrangement described comprises the transistor $T_1$ as the emitter follower (this could also be a tube as cathode follower or a field effect transistor as source electrode follower as designated in FIG. 1*a* by "FET"), the emitter impedance being mainly determined by the resistor $R_s$ and the capacitor $C_s$. A signal originating from the signal source $V_i$ controls the transistor $T_1$, as a result of which a proportional current is passed through the cable K. The termination of the cable K is low-ohmic and would produce a low voltage at the output. However, according to the invention, the transistor $T_2$ in grounded base connection is provided so that a sufficiently large resistor $R_1$ can be arranged between its base and its collector to produce a comparatively high voltage at the output $V_o$ of the signal amplifier. However, when high frequencies are present in the signal of the signal source $V_i$, the capacitance $C_1$ decreases the voltage at the output $V_o$ so that the transmission of these frequencies is less satisfactory. Since, however, according to the invention, provision is further made of the capacitor $C_i$ connected in parallel with the transistor $T_1$ and of the resistor $R_i$ connected in series with the base of the transistor $T_1$, the said loss of amplification across the capacitance $C_1$ will be compensated for. The capacitance of the capacitor $C_i$ for a frequency-independent signal transmission will have to be approximately equal to $nC_1$, where $$n=\left(\frac{V_o}{V_i}\right)$$

represents the transmission ratio for direct voltage. The resistance value of resistor $R_i$ has to be approximately equal to $$R_i=\frac{C_s}{C_g}R_s$$

where $C_g$ represents the capacitance of the input of the transistor $T_1$ denoted by *b* and *g*, respectively, with respect to ground.

Thus, the impedance is properly matched between the various elements so that satisfactory transmission in a wide frequency range are ensured.

The input voltage $V_i$, which can be transmitted without distortion by the circuit arrangement according to the invention, is proportional to the value of the resistor $R_s$. In a circuit arrangement in which the cable not including the capacitor $C_i$ directly loads the voltage follower amplifier, a voltage $V_i$ proportional to the ratio between the resistors $R_s$ and $R_o$, where $R_o$ represents the cable impedance, can be transmitted without distortion. A considerable improvement is obtained by the use of the circuit arrangement according to the invention, since $R_o=75\Omega$ and $R_s$ may be, for example, 4500Ω. The maximum permissible voltage $V_i$ is now mainly determined by the breakdown voltage (gate-drain breakdown voltage of a field effect transistor "FET" used as transistor $T_1$) of the transistor $T_1$.

If the parallel-combination of the resistor $R_s$ and the capacitor $C_s$ is connected together with the coil L across the resistor $R_2$ of the resistor $R_1$ divided into two parts $R_2$ and $R_3$, it is possible, to obtain a further improvement in the frequency transmission characteristic.

FIG. 1*a* shows diagrammatically a field effect transistor "FET" which can replace the transistor $T_1$ of FIGURE 1. The use of such a field effect transistor is of great importance with regard to the high impedance desired for signal amplifiers.

What is claimed is:

1. A signal amplifier for a source of electric signals to be amplified comprising, a voltage follower amplifier connected to said signal source and via a cable to a matched cable-terminating impedance, said cable-terminating impedance comprising the emitter-base circuit of an amplifier connected in grounded base configuration, a capacitor connected in parallel to the said voltage follower amplifier, and a resistor connected in series with the input electrode of the voltage follower amplifier and having a value sufficient to compensate for the loss of amplification of the high-frequency signals in the amplifier connected in grounded base configuration.

2. A signal amplifier as claimed in claim 1, characterized in that the voltage follower amplifier is a field effect transistor in source-electrode connection.

References Cited

UNITED STATES PATENTS 3,168,656 2/1965 Kobbe ---------- 330—204 XR

ROY LAKE, *Primary Examiner.*

JAMES B. MULLINS, *Assistant Examiner.*

U.S. Cl. X.R.

330—26, 56, 151, 35